(12) United States Patent
Kish (10) Patent No.: US 8,355,343 B2
(45) Date of Patent: Jan. 15, 2013

(54) DETERMINING ASSOCIATIONS IN A MESH NETWORK

(75) Inventor: William S. Kish, Saratoga, CA (US)

(73) Assignee: Ruckus Wireless, Inc., Sunnyvale, CA (US)

( * ) Notice: Subject to any disclaimer, the term of this patent is extended or adjusted under 35 U.S.C. 154(b) by 343 days.

(21) Appl. No.: 12/008,715

(22) Filed: Jan. 11, 2008

(65) Prior Publication Data

US 2009/0180396 A1    Jul. 16, 2009

(51) Int. Cl.
*H04L 12/28*    (2006.01)

(52) U.S. Cl. ........................ 370/254; 370/338

(58) Field of Classification Search .................. None
See application file for complete search history.

(56) References Cited

U.S. PATENT DOCUMENTS

| | | | |
|---|---|---|---|
| 1,653,664 A | 12/1927 | Kirkup |
| 4,176,356 A | 11/1979 | Foster et al. |
| 4,193,077 A | 3/1980 | Greenberg et al. |
| 4,253,193 A | 2/1981 | Kennard |
| 4,305,052 A | 12/1981 | Baril et al. |
| 4,513,412 A | 4/1985 | Cox |
| 4,814,777 A | 3/1989 | Monser |
| 5,097,484 A | 3/1992 | Akaiwa |
| 5,117,430 A | 5/1992 | Berglund |
| 5,173,711 A | 12/1992 | Takeuchi et al. |
| 5,203,010 A | 4/1993 | Felix |
| 5,220,340 A | 6/1993 | Shafai |
| 5,220,678 A | 6/1993 | Feei |
| 5,361,256 A | 11/1994 | Doeringer |
| 5,373,548 A | 12/1994 | McCarthy |
| 5,408,465 A | 4/1995 | Gusella et al. |
| 5,507,035 A | 4/1996 | Bantz |
| 5,559,800 A | 9/1996 | Mousseau et al. |
| 5,570,366 A | 10/1996 | Baker |
| 5,608,726 A | 3/1997 | Virgile |
| 5,636,213 A | 6/1997 | Eastmond et al. |
| 5,754,145 A | 5/1998 | Evans |
| 5,767,809 A | 6/1998 | Chuang et al. |
| 5,802,312 A | 9/1998 | Lazaridis et al. |
| 5,867,109 A | 2/1999 | Wiedeman |
| 5,930,259 A | 7/1999 | Katsube |

(Continued)

FOREIGN PATENT DOCUMENTS

EP    0352787    7/1989

(Continued)

OTHER PUBLICATIONS

Tsunekawa, Kouichi, "Diversity Antennas for Portable Telephones", 39th IEEE Vehicular Technology Conference, pp. 50-56, vol. 1, Gateway to New Concepts in Vehicular Technology, May 1-3, 1989, San Francisco, CA.

(Continued)

*Primary Examiner* — Chirag Shah
*Assistant Examiner* — Suk Jin Kang
(74) *Attorney, Agent, or Firm* — Lewis and Roca LLP (57) ABSTRACT

Determining associations in wireless mesh networks are provided. In a mesh network that includes a wired border node and multiple wireless nodes, each wireless node advertises a backhaul throughput approximating the throughput between that wireless node and the wired border node. Using the advertised backhaul throughput information and the stored local throughput information, a receiving node determines a node association from among various candidate nodes.

16 Claims, 4 Drawing Sheets

U.S. PATENT DOCUMENTS

| | | | |
|---|---|---|---|
| 5,940,771 A | 8/1999 | Gollnick et al. |
| 5,960,344 A | 9/1999 | Mahany |
| 5,964,830 A | 10/1999 | Durett |
| 5,970,410 A | 10/1999 | Carney et al. |
| 5,974,034 A | 10/1999 | Chin et al. |
| 6,018,659 A | 1/2000 | Ayyagari et al. |
| 6,034,638 A | 3/2000 | Thiel et al. |
| 6,044,062 A | 3/2000 | Brownrigg et al. |
| 6,088,570 A | 7/2000 | Komara et al. |
| 6,094,177 A | 7/2000 | Yamamoto |
| 6,132,306 A | 10/2000 | Trompower |
| 6,181,697 B1 | 1/2001 | Nurenberg |
| 6,249,516 B1 | 6/2001 | Brownrigg et al. |
| 6,266,528 B1 | 7/2001 | Farzaneh |
| 6,266,537 B1 | 7/2001 | Kashitani et al. |
| 6,292,153 B1 | 9/2001 | Aiello et al. |
| 6,307,524 B1 | 10/2001 | Britain |
| 6,317,599 B1 | 11/2001 | Rappaport et al. |
| 6,326,922 B1 | 12/2001 | Hegendoerfer |
| 6,337,628 B2 | 1/2002 | Campana, Jr. |
| 6,337,668 B1 | 1/2002 | Ito et al. |
| 6,339,404 B1 | 1/2002 | Johnson et al. |
| 6,345,043 B1 | 2/2002 | Hsu |
| 6,356,242 B1 | 3/2002 | Ploussios |
| 6,356,243 B1 | 3/2002 | Schneider et al. |
| 6,356,905 B1 | 3/2002 | Gershman et al. |
| 6,377,227 B1 | 4/2002 | Zhu et al. |
| 6,392,610 B1 | 5/2002 | Braun et al. |
| 6,393,261 B1 | 5/2002 | Lewis |
| 6,404,386 B1 | 6/2002 | Proctor, Jr. et al. |
| 6,404,775 B1 | 6/2002 | Leslie et al. |
| 6,407,719 B1 | 6/2002 | Ohira et al. |
| 6,414,955 B1 | 7/2002 | Clare et al. |
| 6,418,138 B1 | 7/2002 | Cerf et al. |
| 6,442,507 B1 | 8/2002 | Skidmore et al. |
| 6,445,688 B1 | 9/2002 | Garces et al. |
| 6,493,679 B1 | 12/2002 | Rappaport et al. |
| 6,498,589 B1 | 12/2002 | Horii |
| 6,499,006 B1 | 12/2002 | Rappaport et al. |
| 6,505,253 B1 | 1/2003 | Chiu |
| 6,507,321 B2 | 1/2003 | Oberschmidt et al. |
| 6,584,080 B1 | 6/2003 | Ganz et al. |
| 6,625,454 B1 | 9/2003 | Rappaport et al. |
| 6,674,459 B2 | 1/2004 | Ben-Shachar et al. |
| 6,701,522 B1 | 3/2004 | Rubin et al. |
| 6,704,301 B2 | 3/2004 | Chari et al. |
| 6,714,551 B1 | 3/2004 | Le-Ngoc |
| 6,725,281 B1 | 4/2004 | Zintel et al. |
| 6,728,514 B2 | 4/2004 | Bandeira et al. |
| 6,753,814 B2 | 6/2004 | Killen et al. |
| 6,762,723 B2 | 7/2004 | Nallo et al. |
| 6,778,517 B1 | 8/2004 | Lou et al. |
| 6,779,004 B1 | 8/2004 | Zintel |
| 6,819,287 B2 | 11/2004 | Sullivan et al. |
| 6,836,481 B1 | 12/2004 | Hotta |
| 6,873,627 B1 | 3/2005 | Miller |
| 6,876,280 B2 | 4/2005 | Nakano |
| 6,888,504 B2 | 5/2005 | Chiang et al. |
| 6,888,893 B2 | 5/2005 | Li et al. |
| 6,892,230 B1 | 5/2005 | Gu et al. |
| 6,906,678 B2 | 6/2005 | Chen |
| 6,910,068 B2 | 6/2005 | Zintel et al. |
| 6,924,768 B2 | 8/2005 | Wu et al. |
| 6,931,429 B2 | 8/2005 | Gouge et al. |
| 6,941,143 B2 | 9/2005 | Mathur |
| 6,950,019 B2 | 9/2005 | Bellone et al. |
| 6,957,042 B2 | 10/2005 | Williams |
| 6,957,277 B2 | 10/2005 | Yagyu et al. |
| 6,961,028 B2 | 11/2005 | Joy et al. |
| 6,973,622 B1 | 12/2005 | Rappaport et al. |
| 6,975,834 B1 | 12/2005 | Forster |
| 6,996,086 B2 | 2/2006 | Wolfe et al. |
| 7,034,770 B2 | 4/2006 | Yang et al. |
| 7,043,277 B1 | 5/2006 | Pfister |
| 7,050,809 B2 | 5/2006 | Lim |
| 7,053,853 B2 | 5/2006 | Merenda et al. |
| 7,064,717 B2 | 6/2006 | Kaluzni et al. |
| 7,076,274 B2 | 7/2006 | Jollota et al. |
| 7,085,814 B1 | 8/2006 | Ghandi et al. |
| 7,089,307 B2 | 8/2006 | Zintel et al. |
| 7,113,519 B2 | 9/2006 | Hammel et al. |
| 7,130,895 B2 | 10/2006 | Zintel et al. |
| 7,136,655 B2 | 11/2006 | Skafidas et al. |
| 7,149,197 B2 | 12/2006 | Garahi et al. |
| 7,157,757 B2 | 1/2007 | Parekh et al. |
| 7,161,934 B2 | 1/2007 | Buchsbaum |
| 7,164,667 B2 | 1/2007 | Rayment et al. |
| 7,171,223 B2 | 1/2007 | Herscovich et al. |
| 7,171,475 B2 | 1/2007 | Weisman et al. |
| 7,187,925 B2 | 3/2007 | Abhishek |
| 7,203,508 B2 | 4/2007 | Ohkubo et al. |
| 7,269,174 B2 | 9/2007 | Olson et al. |
| 7,283,494 B2 | 10/2007 | Hammel et al. |
| 7,289,505 B2 | 10/2007 | Sanchez |
| 7,292,617 B2 | 11/2007 | Beasley et al. |
| 7,321,571 B2 | 1/2008 | Schnack et al. |
| 7,336,642 B2 | 2/2008 | Rich et al. |
| 7,355,997 B2 | 4/2008 | Qian |
| 7,362,737 B2 | 4/2008 | Behroozi |
| 7,369,510 B1 | 5/2008 | Wong |
| 7,489,932 B2 | 2/2009 | Chari et al. |
| 7,496,680 B2 | 2/2009 | Canright |
| 7,505,426 B2 | 3/2009 | Srikrishna et al. |
| 7,505,447 B2 | 3/2009 | Kish et al. |
| 7,522,731 B2 | 4/2009 | Klemba et al. |
| 7,546,126 B2 | 6/2009 | Beasley et al. |
| 7,551,562 B2 | 6/2009 | Srikrishna et al. |
| 7,586,879 B2 | 9/2009 | Chari et al. |
| 7,672,274 B2 | 3/2010 | Bims |
| 7,697,504 B2 | 4/2010 | Chari et al. |
| 7,715,395 B2 | 5/2010 | Ginchereau et al. |
| 7,733,833 B2 | 6/2010 | Kalika et al. |
| 7,787,436 B2 | 8/2010 | Kish et al. |
| 7,853,829 B2 | 12/2010 | Younger et al. |
| 7,916,684 B2 | 3/2011 | Henderson et al. |
| 8,089,869 B2 | 1/2012 | Kisela et al. |
| 8,089,949 B2 | 1/2012 | Kish et al. |
| 8,125,975 B2 | 2/2012 | Kish et al. |
| 2001/0047474 A1 | 11/2001 | Takagi et al. |
| 2001/0055312 A1 | 12/2001 | Negus |
| 2002/0001310 A1 | 1/2002 | Mai |
| 2002/0031130 A1 | 3/2002 | Tsuchiya et al. |
| 2002/0036996 A1 | 3/2002 | Ozluturk et al. |
| 2002/0045435 A1 | 4/2002 | Fantaske |
| 2002/0047800 A1 | 4/2002 | Proctor, Jr. et al. |
| 2002/0080767 A1 | 6/2002 | Lee |
| 2002/0084942 A1 | 7/2002 | Tsai et al. |
| 2002/0105471 A1 | 8/2002 | Kojima et al. |
| 2002/0112058 A1 | 8/2002 | Weisman et al. |
| 2002/0114330 A1 | 8/2002 | Cheung et al. |
| 2002/0143951 A1 | 10/2002 | Khan |
| 2002/0158798 A1 | 10/2002 | Chiang et al. |
| 2002/0158801 A1 | 10/2002 | Crilly, Jr. et al. |
| 2002/0164963 A1 | 11/2002 | Tehrani et al. |
| 2002/0170064 A1 | 11/2002 | Monroe et al. |
| 2002/0194367 A1 | 12/2002 | Nakamura et al. |
| 2003/0003917 A1 | 1/2003 | Copley et al. |
| 2003/0026240 A1 | 2/2003 | Eyuboglu et al. |
| 2003/0026268 A1 | 2/2003 | Nava |
| 2003/0030588 A1 | 2/2003 | Kalis et al. |
| 2003/0063591 A1 | 4/2003 | Leung et al. |
| 2003/0122714 A1 | 7/2003 | Wannagot et al. |
| 2003/0133458 A1 | 7/2003 | Sato et al. |
| 2003/0169330 A1 | 9/2003 | Ben-Shachar et al. |
| 2003/0184490 A1 | 10/2003 | Raiman et al. |
| 2003/0189514 A1 | 10/2003 | Miyano et al. |
| 2003/0189521 A1 | 10/2003 | Yamamoto et al. |
| 2003/0189523 A1 | 10/2003 | Ojantakanen et al. |
| 2003/0210207 A1 | 11/2003 | Suh et al. |
| 2003/0227414 A1 | 12/2003 | Saliga et al. |
| 2003/0228857 A1 | 12/2003 | Maeki |
| 2003/0231593 A1 | 12/2003 | Bauman et al. |
| 2004/0008663 A1* | 1/2004 | Srikrishna et al. ............ 370/351 |
| 2004/0014432 A1 | 1/2004 | Boyle |
| 2004/0017310 A1 | 1/2004 | Vargas-Hurlston et al. |
| 2004/0017860 A1 | 1/2004 | Liu |
| 2004/0027291 A1 | 2/2004 | Zhang et al. |

| | | | |
|---|---|---|---|
| 2004/0027304 A1 | 2/2004 | Chiang et al. | |
| 2004/0028006 A1 | 2/2004 | Kayama | |
| 2004/0032378 A1 | 2/2004 | Volman et al. | |
| 2004/0036651 A1 | 2/2004 | Toda | |
| 2004/0036654 A1 | 2/2004 | Hsieh | |
| 2004/0041732 A1 | 3/2004 | Aikawa et al. | |
| 2004/0048593 A1 | 3/2004 | Sano | |
| 2004/0058690 A1 | 3/2004 | Ratzel et al. | |
| 2004/0061653 A1 | 4/2004 | Webb et al. | |
| 2004/0070543 A1 | 4/2004 | Masaki | |
| 2004/0080455 A1 | 4/2004 | Lee | |
| 2004/0095278 A1 | 5/2004 | Kanemoto et al. | |
| 2004/0114535 A1 | 6/2004 | Hoffmann et al. | |
| 2004/0125777 A1 | 7/2004 | Doyle et al. | |
| 2004/0190477 A1 | 9/2004 | Olson et al. | |
| 2004/0260800 A1 | 12/2004 | Gu et al. | |
| 2004/0264463 A1 | 12/2004 | Fukushima | |
| 2005/0002395 A1 | 1/2005 | Kondo | |
| 2005/0009523 A1 | 1/2005 | Pekonen | |
| 2005/0022210 A1 | 1/2005 | Zintel et al. | |
| 2005/0032531 A1 | 2/2005 | Gong et al. | |
| 2005/0041739 A1 | 2/2005 | Li et al. | |
| 2005/0042988 A1 | 2/2005 | Hoek et al. | |
| 2005/0074018 A1 | 4/2005 | Zintel et al. | |
| 2005/0074019 A1 | 4/2005 | Handforth et al. | |
| 2005/0074108 A1 | 4/2005 | Dezonno et al. | |
| 2005/0097503 A1 | 5/2005 | Zintel et al. | |
| 2005/0135480 A1 | 6/2005 | Li et al. | |
| 2005/0138137 A1 | 6/2005 | Encarnacion et al. | |
| 2005/0138193 A1 | 6/2005 | Encarnacion et al. | |
| 2005/0153720 A1 | 7/2005 | White et al. | |
| 2005/0180381 A1 | 8/2005 | Retzer et al. | |
| 2005/0185666 A1 | 8/2005 | Raya et al. | |
| 2005/0188193 A1 | 8/2005 | Kuehnel et al. | |
| 2005/0226239 A1 | 10/2005 | Nishida et al. | |
| 2005/0232179 A1 | 10/2005 | Da Costa et al. | |
| 2005/0240665 A1 | 10/2005 | Gu et al. | |
| 2005/0250544 A1 | 11/2005 | Grant et al. | |
| 2005/0267935 A1 | 12/2005 | Ghandi et al. | |
| 2005/0271070 A1 | 12/2005 | Mikami et al. | |
| 2006/0018335 A1 | 1/2006 | Koch | |
| 2006/0094371 A1 | 5/2006 | Nguyen | |
| 2006/0098605 A1 | 5/2006 | Li | |
| 2006/0098607 A1 | 5/2006 | Zeng et al. | |
| 2006/0098613 A1 | 5/2006 | Kish et al. | |
| 2006/0098616 A1 | 5/2006 | Kish et al. | |
| 2006/0114881 A1 | 6/2006 | Chari et al. | |
| 2006/0123124 A1 | 6/2006 | Weisman et al. | |
| 2006/0123125 A1 | 6/2006 | Weisman et al. | |
| 2006/0123455 A1 | 6/2006 | Pai et al. | |
| 2006/0133341 A1 | 6/2006 | Chari et al. | |
| 2006/0165029 A1 | 7/2006 | Melpignano et al. | |
| 2006/0168159 A1 | 7/2006 | Weisman et al. | |
| 2006/0184660 A1 | 8/2006 | Rao et al. | |
| 2006/0184661 A1 | 8/2006 | Weisman et al. | |
| 2006/0184693 A1 | 8/2006 | Rao et al. | |
| 2006/0187660 A1 | 8/2006 | Liu | |
| 2006/0224690 A1 | 10/2006 | Falkenburg et al. | |
| 2006/0225107 A1 | 10/2006 | Seetharaman et al. | |
| 2006/0227761 A1 | 10/2006 | Scott, III et al. | |
| 2006/0239369 A1 | 10/2006 | Lee | |
| 2006/0268881 A1 | 11/2006 | Moreton | |
| 2006/0280131 A1 | 12/2006 | Rahman et al. | |
| 2006/0291434 A1 | 12/2006 | Gu et al. | |
| 2007/0002750 A1 | 1/2007 | Sang et al. | |
| 2007/0010271 A1* | 1/2007 | Roy | 455/517 |
| 2007/0027622 A1 | 2/2007 | Cleron et al. | |
| 2007/0030811 A1 | 2/2007 | Frei et al. | |
| 2007/0101020 A1 | 5/2007 | Lin et al. | |
| 2007/0109961 A1* | 5/2007 | Liang | 370/229 |
| 2007/0135167 A1 | 6/2007 | Liu | |
| 2007/0189283 A1 | 8/2007 | Agarwal et al. | |
| 2007/0223451 A1 | 9/2007 | Ren et al. | |
| 2007/0242602 A1 | 10/2007 | Pang et al. | |
| 2008/0043638 A1* | 2/2008 | Ribiere et al. | 370/254 |
| 2008/0069068 A1* | 3/2008 | Dean et al. | 370/342 |
| 2008/0137681 A1 | 6/2008 | Kish et al. | |
| 2008/0137682 A1 | 6/2008 | Kish et al. | |
| 2008/0159207 A1 | 7/2008 | Levine et al. | |
| 2008/0225804 A1* | 9/2008 | Thubert et al. | 370/338 |
| 2008/0247317 A1* | 10/2008 | Weil et al. | 370/237 |
| 2008/0247327 A1* | 10/2008 | Weil et al. | 370/252 |
| 2008/0267116 A1 | 10/2008 | Kang et al. | |
| 2009/0019314 A1 | 1/2009 | Younger et al. | |
| 2009/0028095 A1 | 1/2009 | Kish et al. | |
| 2009/0040989 A1 | 2/2009 | Da Costa et al. | |
| 2009/0067369 A1* | 3/2009 | Stamoulis et al. | 370/328 |
| 2009/0073921 A1 | 3/2009 | Ji et al. | |
| 2009/0080333 A1* | 3/2009 | Ozer et al. | 370/237 |
| 2009/0154359 A1* | 6/2009 | Strutt et al. | 370/238 |
| 2009/0207730 A1 | 8/2009 | Stamoulis et al. | |
| 2009/0213730 A1 | 8/2009 | Zeng et al. | |
| 2009/0225676 A1 | 9/2009 | Kisela et al. | |
| 2009/0262677 A1 | 10/2009 | Banerjea et al. | |
| 2010/0085916 A1 | 4/2010 | Yu et al. | |
| 2010/0182944 A1 | 7/2010 | Kish et al. | |
| 2011/0096712 A1 | 4/2011 | Kish et al. | |
| 2011/0119360 A1 | 5/2011 | Miu et al. | |
| 2011/0119401 A1 | 5/2011 | Miu et al. | |
| 2011/0216685 A1 | 9/2011 | Kish et al. | |
| 2012/0063379 A1 | 3/2012 | Kish et al. | |

FOREIGN PATENT DOCUMENTS

| | | |
|---|---|---|
| EP | 0 534 612 | 3/1993 |
| EP | 1 315 311 | 5/2003 |
| EP | 1 450 521 | 8/2004 |
| EP | 1 608 108 | 12/2005 |
| EP | 1 653 664 | 5/2006 |
| GB | 2306278 A | 4/1997 |
| JP | 3038933 | 7/1989 |
| JP | 2008/088633 | 2/1996 |
| JP | 2001/057560 | 2/2002 |
| JP | 2005/354249 | 12/2005 |
| JP | 2006/060408 | 3/2006 |
| WO | WO 02/25967 | 3/2002 |
| WO | WO0249360 A1 | 6/2002 |
| WO | WO 03/079484 | 9/2003 |
| WO | 2005/008938 | 1/2005 |
| WO | WO 2007/016326 | 2/2007 |

OTHER PUBLICATIONS

Hirayama et al., Next-Generation Mobil-Access IP Network, Hitachi Review, vol. 49 (2000), No. 4, pp. 176-179.

Hjalmtysson et al., Overcoming Last-Hop/First-Hop Problems in IP Multicast, Reykjavik University, Dept. of Computer Science, Ofanleiti 2, 103 Reykjavik, Iceland, (The Icelandic Centre for Research under grant No. 020500002.).

Visoottiviseth et al., Sender-Initiated Multicast Forwarding Scheme, Telecommunications, 2003. ICT 2003 10th International Conference, pp. 334-339, downloaded on Mar. 26, 2009 from IEEE Xplore, 0-7803-7661 (c) 2003 IEEE.

Tang et al., Mac Reliable Broadcast in Ad Hoc Networks, Computer Science Dept., University of California, Los Angeles, pp. 1008-1013, 0-7803-7225 (c) 2001 IEEE.

Ken Tang, et al., "MAC Layer Broadcast Support in 802.11 Wireless Networks," Computer Science Department, University of California, Los Angeles, 2000 IEEE, pp. 544-548.

Ken Tang, et al., "MAC Reliable Broadcast in Ad Hoc Networks," Computer Science Department, University of California, Los Angeles, 2001 IEEE, pp. 1008-1013.

Vincent D. Park, et al., "A Performance Comparison of the Temporally-Ordered Routing Algorithm and Ideal Link-State Routing," IEEE, Jul. 1998, pp. 592-598.

Ian F. Akyiloiz, et al., "A Virtual Topology Based Routing Protocol for Multihop Dynamic Wireless Networks," Broadband and Wireless Networking Lab, School of Electrical and Computer Engineering, Georgia Institute of Technology.

Dell Inc., "How Much Broadcast and Multicast Traffic Should I Allow in My Network," PowerConnect Application Note #5, Nov. 2003.

Toskala, Antti, "Enhancement of Broadcast and Introduction of Multicast Capabilities in RAN," Nokia Networks, Palm Springs, California, Mar. 13-16, 2001.

Microsoft Corporation, "IEEE 802.11 Networks and Windows XP," Windows Hardware Developer Central, Dec. 4, 2001.
Festag, Andreas, "What is MOMBASA?" Telecommunication Networks Group (TKN), Technical University of Berlin, Mar. 7, 2002.
Hewlett Packard, "HP ProCurve Networking: Enterprise Wireless LAN Networking and Mobility Solutions," 2003.
Dutta, Ashutosh et al., "MarconiNet Supporting Streaming Media Over Localized Wireless Multicast," Proc. of the 2d Int'l Workshop on Mobile Commerce, 2002.
Dunkels, Adam et al., "Making TCP/IP Viable for Wireless Sensor Networks," Proc. of the 1st Euro. Workshop on Wireless Sensor Networks, Berlin, Jan. 2004.
Dunkels, Adam et al., "Connecting Wireless Sensomets with TCP/IP Networks," Proc. of the 2d Int'l Conf. on Wired Networks, Frankfurt, Feb. 2004.
Cisco Systems, "Cisco Aironet Access Point Software Configuration Guide: Configuring Filters and Quality of Service," Aug. 2003.
Hirayama, Koji et al., "Next-Generation Mobile-Access IP Network," Hitachi Review vol. 49, No. 4, 2000.
Pat Calhoun et al., "802.11r strengthens wireless voice," Technology Update, Network World, Aug. 22, 2005, http://www.networkworld.com/news/tech/2005/082208techupdate.html.
Areg Alimian et al., "Analysis of Roaming Techniques," doc.:IEEE 802.11-04/0377r1, Submission, Mar. 2004.
Information Society Technologies Ultrawaves, "System Concept / Architecture Design and Communication Stack Requirement Document," Feb. 23, 2004.
Golmie, Nada, "Coexistence in Wireless Networks: Challenges and System-Level Solutions in the Unlicensed Bands," Cambridge University Press, 2006.
Mawa, Rakesh, "Power Control in 3G Systems," Hughes Systique Corporation, Jun. 28, 2006.
Wennstrom, Mattias et al., "Transmit Antenna Diversity in Ricean Fading MIMO Channels with Co-Channel Interference," 2001.
Steger, Christopher et al., "Performance of IEEE 802.11b Wireless LAN in an Emulated Mobile Channel," 2003.
Chang, Nicholas B. et al., "Optimal Channel Probing and Transmission Scheduling for Opportunistics Spectrum Access," Sep. 2007.
Akyildiz et al., "Wireless mesh networks: a survey," Computer Networks, 2005.
Cato et al., "Method for Easier, Better, and Faster Site Surveys for Wireless Networks," IBM Technical Disclosure Bulletin, vol. 40, No. 1, 1997.
Chawla, "Design of a Wireless Backhaul Network for Microcells," 1999.
Johansson et al., "Relaying Access Points and Related Business Models for Low Cost Mobile Systems," 2004.
Yanikomeroglu, "Cellular Multihop Communications: Infrastructure—Based Relay Network Architecture for 4G Wireless Systems," 2004.
Gillham, Burce et al. JUNOSe Internet Software for E-Series Routing Platforms Policy and QoS Confirguaration Guide, Release 7.0x.
Weighted Fair Queuing, http://en.wikipedia.org/wiki/Weighted_fair_queuing.
Weighted Round Robin, http:en.wikipedia.org/wiki/Weighted_round_robin.
U.S. Appl. No. 12/181,274, Final Office Action mailed Jan. 18, 2012.
U.S. Appl. No. 11/232,196, Office Action mailed May 15, 2008.
U.S. Appl. No. 11/232,196, Final Office Action mailed Dec. 26, 2007.
U.S. Appl. No. 11/232,196, Office Action mailed Apr. 5, 2007.
U.S. Appl. No. 11/267,477, Final Office Action mailed Jun. 10, 2009.
U.S. Appl. No. 11/267,477, Office Action mailed Sep. 25, 2008.
U.S. Appl. No. 12/947,803, Office Action mailed Aug. 27, 2012.
Fair queuing, http://en.wikipedia.org/wiki/fair_queuing.
PCT Search Report and Written Opinion for PCT/US08/014148 mailed Mar. 30, 2009.
PCT Search Report and Written Opinion for PCT/US11/059019 mailed Feb. 21, 2012.
PCT Search Report and Written Opinion for PCT/US05/039760 mailed Sep. 14, 2006.
PCT Search Report and Written Opinion for PCT/US05/039760 mailed May 3, 2011.
U.S. Appl. No. 12/181,274, Office Action mailed Nov. 15, 2012.
U.S. Appl. No. 12/938,316, Office Action mailed Nov. 20, 2012.
U.S. Appl. No. 12/947,800, Office Action mailed Sep. 26, 2012.

* cited by examiner

DETERMINING ASSOCIATIONS IN A MESH NETWORK

BACKGROUND OF THE INVENTION

1. Field of the Invention

The present invention generally relates to communication networks. More specifically, the present invention relates to determining node associations in mesh networks.

2. Description of Related Art

A mesh network is a way to communicate information through multiple nodes, which may be distributed over an area. The multiple nodes allow for an information packet to travel through multiple routes to any given receiving node or device. The nodes in a mesh network may communicate through wired or wireless connections. In an Institute of Electrical and Electronics Engineers (IEEE) 802.11 network, an access point (e.g., a base station) communicates data to one or more remote receiving nodes over a wireless link. A lightweight mesh network, for example, may have a single wired node serving as the access point and multiple wireless receiving nodes. Each wireless node may have an internal mesh basic service set (MBSS). Each MBSS in the mesh network may have a unique basic service set identifier (BSSID) but share an identical service set identifier (SSID) and/or pre-shared key (PSK). A node may identify another node in the network by reference to the other node's BSSID.

Each transmission from one node to another may be referred to as a hop. Each of the nodes in a mesh network may connect with one another through one or more hops. For example, a first receiving node, or child node, receives information from a parent node via one hop.

A mesh network where all nodes are directly connected to one other may be referred to as a fully connected network. Information transmission in a fully connected network may take only one hop (e.g., from a parent node to a child node). In some mesh networks, however, information transmission may require multiple hops through multiple nodes. If there is a grandparent node, for example, two hops are required for the information to be sent from grandparent to parent to child, and so forth.

Depending on the configuration of the nodes, an information packet may be transmitted to a receiving node or device through multiple possible routes. The particular route taken by an information packet may be determined by various available routing algorithms. Generally, a goal of a routing algorithm is to allow information to be transmitted quickly and efficiently to a receiving node.

Determining a route presents a difficult optimization problem. Routing algorithms may have to determine how a node learns what other nodes are available, with which of the other node(s) to associate, which associations allow for quick and efficient information transfer, and so forth. Some routing algorithms may determine that a receiving node be associated with particular route(s) and/or particular parent node(s).

Various circumstances may require that a route be changed for a given receiving node. For example, a parent node may fail, and the receiving node may have to associate with a different parent node. Other circumstances requiring a change in routing may include changes in network traffic, changes in data rates, changes in the weather, etc. There is, therefore, a need for improved systems and methods for determining associations in a mesh network.

SUMMARY OF THE INVENTION

Exemplary systems and methods provide for determining associations in mesh networks. In a mesh network that includes a wired border node and multiple wireless nodes, each wireless node advertises a backhaul throughput measuring the throughput between that wireless node and the wired border node. Using the advertised backhaul throughput information and the stored local throughput information, a receiving node determines an association from among various candidate nodes. In some embodiments, each wireless node is associated with only one parent node.

In an exemplary embodiment, a node may store information concerning an estimated local throughput between that node and other nodes in the network. That node may also receive and store information concerning an estimated backhaul throughput from the other nodes. Using the local and backhaul throughput estimates, the node determines an uplink throughput for each of the other nodes. The node may then associate with another node based on the uplink throughput of the other node.

An exemplary apparatus may determine associations in mesh networks in accordance with an embodiment of the present invention. The apparatus may include a data table, a processor, and an antenna. Using information received and/or stored in the data table, the processor can approximate an uplink throughput for various candidate nodes. The antenna can wirelessly connect the apparatus to one of the candidate nodes, based on the determined uplink throughput.

An exemplary system as claimed may include a wired border node and at least one wireless node configured to associate with one of several candidate nodes based on uplink throughput. Some embodiments further include the candidate nodes.

Some embodiments of the present invention include computer readable storage media and instructions for determining associations in mesh networks. Some embodiments further include instructions for disassociation from a node and associations with a new node based on updated information.

DETAILED DESCRIPTION

Figure 1:
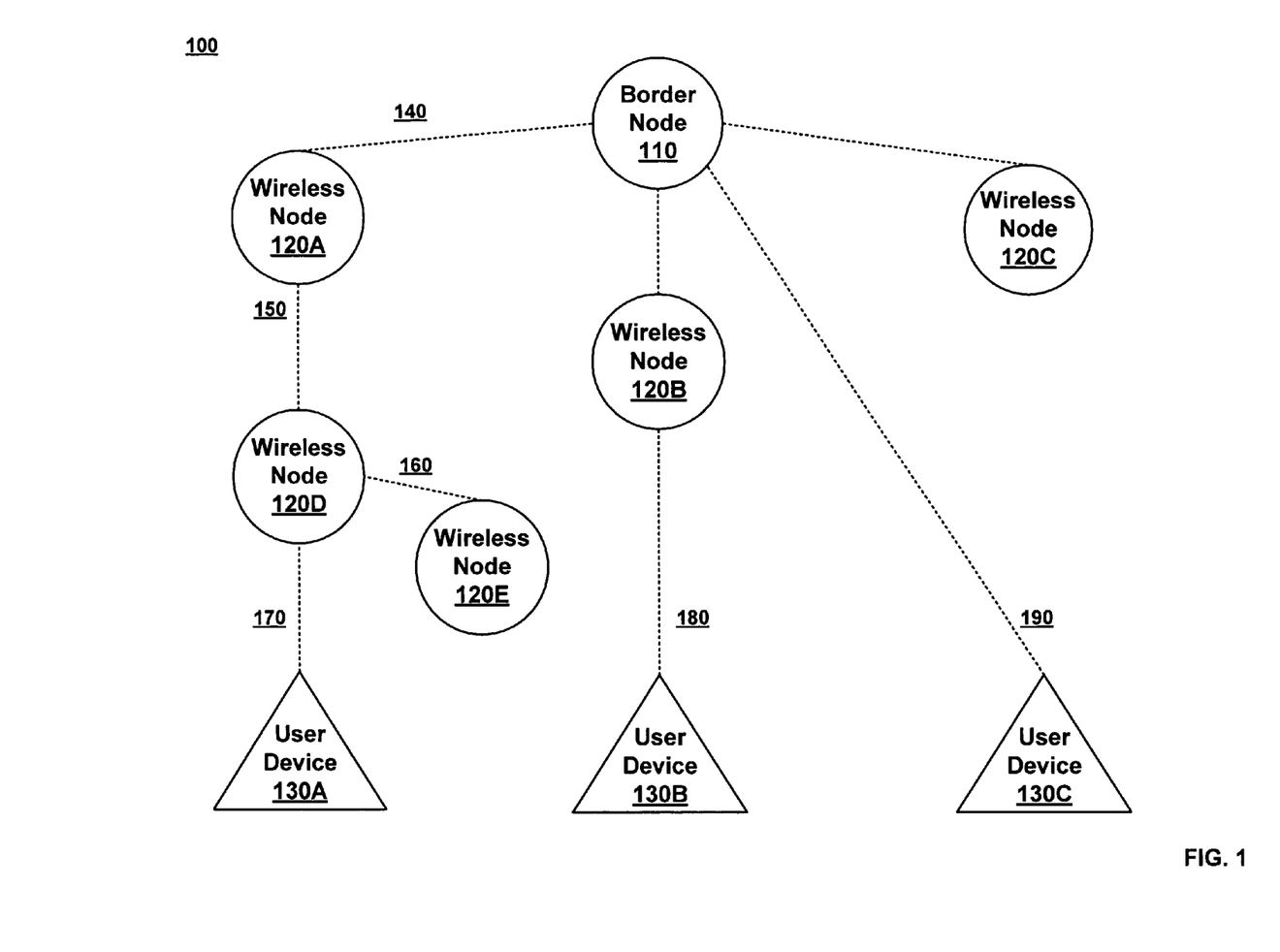
FIG. 1 illustrates a mesh network according to an exemplary embodiment of the present invention.

FIG. 1 illustrates a mesh network 100, according to an exemplary embodiment of the present invention. Mesh network 100 may be a lightweight mesh network that includes a wired border node 110, several wireless nodes 120A-E, and several user devices 130A-C. The illustrated routes (140-190) from the wired border node 110 through the wireless nodes 120A-E to user devices 130A-C demonstrate the variety of possible routes and associations.

Mesh network 100 may be configured to transmit various electromagnetic waves, including, for example, radio signals. Mesh network 100 may be an IEEE 802.11 (Wi-Fi or Wireless LAN) network, IEEE 802.16 (WiMAX) network, IEEE 802.16c network, or the like. Mesh network 100 may be a local, proprietary network or may be a part of a larger wide-area network.

Border node 110 is a wired backhaul gateway configured to provide the other nodes and devices in the mesh network 100 with wireless access to another network, such as the Internet.

In some networks, border node 110 may act an access point, a proxy server, and/or a firewall server. Border node 110 may also advertise an infinite backhaul throughput to the other nodes and devices in the network. Backhaul throughput is the throughput between a node and the border node 110.

Wireless nodes 120A-E may include a variety of wireless transceivers distributed over an area. Each of the wireless nodes 120A-C may receive information transmitted in a route including border node 110. For example, nodes 120A-C may receive information directly from border node 110. Information sent to node 120D may have to go through node 120A. Information to node 120E may have to go through node 120D. Specifically, wireless link 140 illustrates a connection between a wireless node (i.e., wireless node 120A) and the border node 110. Wireless node 120A is a parent node to wireless node 120D through wireless link 150, and wireless node 120D is a parent node to wireless node 120E through wireless link 160.

In some embodiments, some wireless nodes may automatically associate with border node 110. Alternatively, some nodes may associate with a parent node based on, for example, uplink throughput. For example, wireless node 120E may consider associating with various candidate nodes. The candidate nodes may include border node 110 and wireless nodes 120A-D. Using information concerning, for example, backhaul throughput and local throughput for each of the candidate nodes, wireless node 120E may determine an uplink throughput for each candidate node. An uplink throughput of a candidate node is an approximate throughput from the border node to wireless node 120E if wireless node 120E were to associate with the candidate node. Based on the uplink throughput calculated for each candidate node, wireless node 120E may determine with which of the candidate nodes to associate. For example, wireless node 120E may connect to the candidate node associated with the highest uplink throughput.

Wireless nodes 120A-E may also be used to transmit information to a user device. User devices 130A-C may be used by end-users to receive information transmitted through mesh network 100. User devices 130A-C may include desktop computers, laptop computers, and the like. Information from other network, such as the Internet, may be transmitted through mesh network 100 to a user device, such as user device 130A. For example, border node 110 can transmit information from the Internet to user device 130A through the wireless nodes (i.e., wireless nodes 120A and 120D) of mesh network 100. Various routes are possible. To transmit information from border node 110 to user device 130A, for example, requires using wireless link 140 to wireless node 120A, then wireless link 150 to wireless node 120D, and finally, wireless link 170 to user device 130A. Other user devices (e.g., user device 130B and user device 130C) may receive information through different routes. As illustrated, user device 130B is connected to wireless node 120B (which is connected to border node 110) over wireless link 180, while user device 130C is connected directly to border node 110 over wireless link 190.

Figure 2:
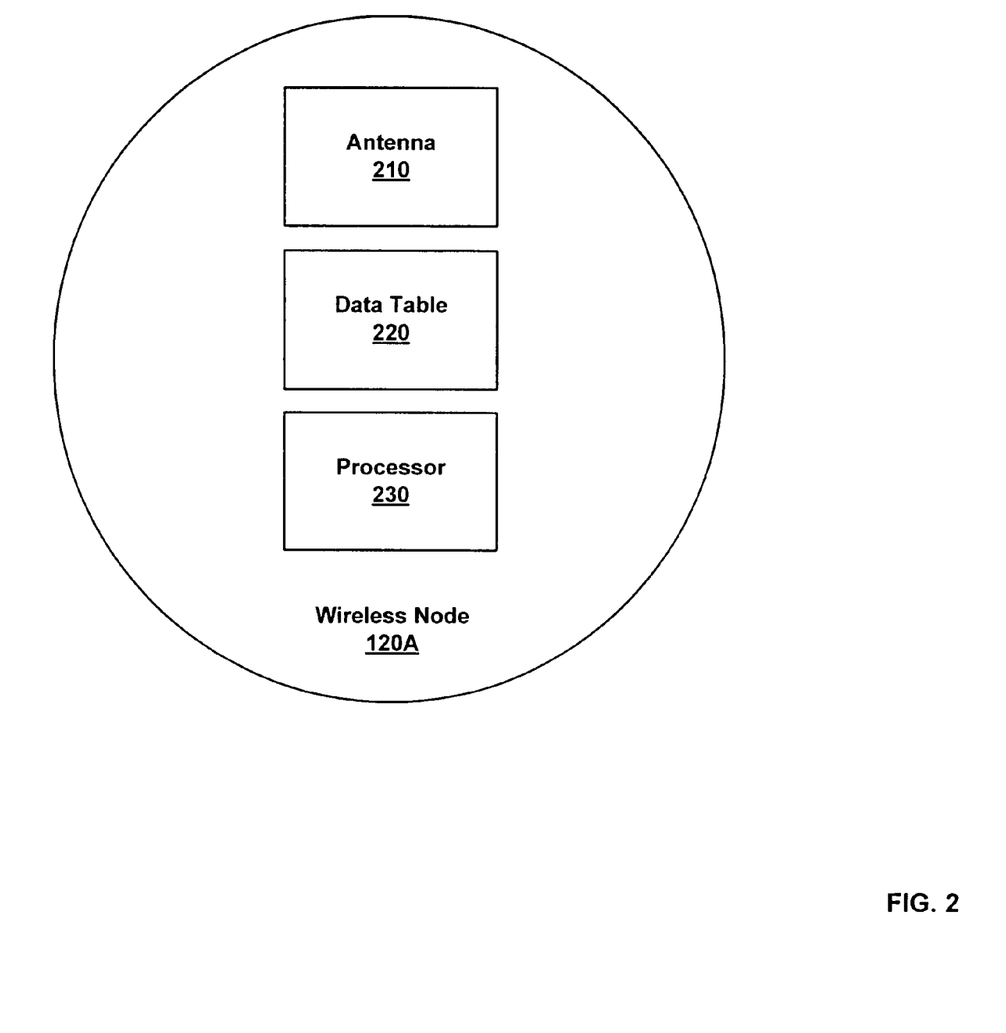
FIG. 2 illustrates an exemplary node for determining associations in a mesh network.

FIG. 2 illustrates an exemplary node apparatus 120A for determining associations in a mesh. Node 120A may include an antenna 210, a data table 220, and a processor 230. In some embodiments, node 120A learns about local throughput and backhaul throughput for each candidate node using information sent and received by antenna 210. The throughput information may be stored in data table 220. Using the information stored in data table 220, processor 230 determines an uplink throughput for each candidate node. Antenna 210 may then create a wireless association with the candidate node based on the determined uplink throughput.

Antenna 210 includes a variety of antenna systems used to receive and transmit data packets wirelessly. For example, antenna 210 can receive packet data, Transmission Control Protocol (TCP) packet data, User Datagram Protocol (UDP) packet data or the like from a parent node using IEEE 802.11 wireless protocol in mesh network 100. One or more wireless links may be created by antenna 210 to allow for data transmission between node 120A and various other nodes in mesh network 100. For example, node 120A may be associated with one or more parent node; further, node 120A may act as a parent node with associated receiving nodes. In some embodiments, node 120A may be associated with only one parent node.

Node 120A may include selectable antenna elements like those disclose in U.S. Pat. No. 7,292,198 for a "System and Method for an Omnidirectional Planar Antenna Apparatus," the disclosure of which is incorporated herein by reference. Node 120A may also utilize various transmission protocols like those disclosed in U.S. patent publication number 2006-0040707 for a "System and Method for Transmission Parameter Control for an Antenna Apparatus with Selectable Elements," the disclosure of which is incorporated herein by reference.

Node 120A learns about various candidate nodes in mesh network 100 by using antenna 210 to periodically send out background traffic. For example, antenna 210 may send out probe requests, which may be received by various candidate nodes. Where node 120A is already associated with a parent node, antenna 210 may send out probe requests only to certain candidate nodes, such as candidate nodes highly ranked by data table 220 (described below). Antenna 210 may also limit the probe requests to those candidate nodes whose backhaul throughput is the same or higher than the backhaul throughput of the parent node.

The candidate nodes may send probe responses, which may be received by antenna 210. In some embodiments, a candidate node in mesh network 100 advertises backhaul throughput information concerning the throughput between the candidate node and the border node 110. Receiving the backhaul information in response to its probe request, antenna 210 may then provide such information concerning the candidate node to data table 220 and/or processor 230. In addition, antenna 210 may request and receive local throughput information. Local throughput is an approximate measure of the throughput between the candidate node and node 120A. Antenna 210 may use a signal, such as TxCtrl, to provide local throughput information based on results of transmission attempts to a candidate node.

Antenna 210 may further serve as a beacon to advertise the backhaul throughput of node 120A to other nodes in mesh network 100. Other nodes in mesh network 100 attempting to learn about mesh traffic can send out their own probe requests which may be received by antenna 210. In some embodiments, antenna 210 may be provided with an uplink throughput associated with the parent node of wireless node 120A. Antenna 210 may then advertise that uplink throughput as the backhaul throughput of wireless node 120A. The other nodes may receive that backhaul information in response to their own probe requests and may use that backhaul information to determine whether to associate with node 120A.

Data table 220 stores information concerning local throughput between wireless node 120A and various candidate nodes in mesh network 100. The information stored in data table 220 may be used to determine an approximate uplink throughput from the border node 110 to wireless node 120A. An exemplary data table 220 may detail information concerning a candidate node including BSSID, signal-to-noise ratio (SNR) of last probe response, local throughput, backhaul throughput, and determined uplink throughput. In some embodiments, the table may be ranked, for example, by uplink throughputs from highest to lowest. Data table 220 may be dynamic due to accumulation of information.

Processor 230 is configured to execute a variety of operations. Using the information in data table 220, processor 230 determines with which of the candidate nodes to associate wireless node 120A. In some embodiments, the determination is based on the uplink throughput of the candidate nodes. For example, processor 230 may determine uplink throughputs for each candidate node in mesh network 110. Uplink throughput may be closely approximated using backhaul and local throughput information. An approximation may be derived using the following formula: 1/(1/local throughput+1/backhaul throughput). The uplink throughput determined for each candidate node may also be stored in data table 220. By comparing the uplink throughput information, processor 230 determines which candidate node to associate with wireless node 120A. For example, the candidate node with the highest uplink throughput may be chosen to be parent node to wireless node 120A.

In some embodiments, information in data table 220 may be updated. Using the updated information, processor 230 may determine that another candidate node has a higher uplink throughput. As a result, processor 230 may direct antenna 210 to disconnect from a current parent node and to connect instead to the other candidate node with the higher uplink throughput. In some embodiments, the uplink throughput of the other candidate node must exceed the uplink throughput of the current parent by a certain amount before processor 230 will instruct antenna 210 to re-associate with the new candidate node. Heuristics may also be involved in determining whether disassociation/re-association occurs.

Figure 3:
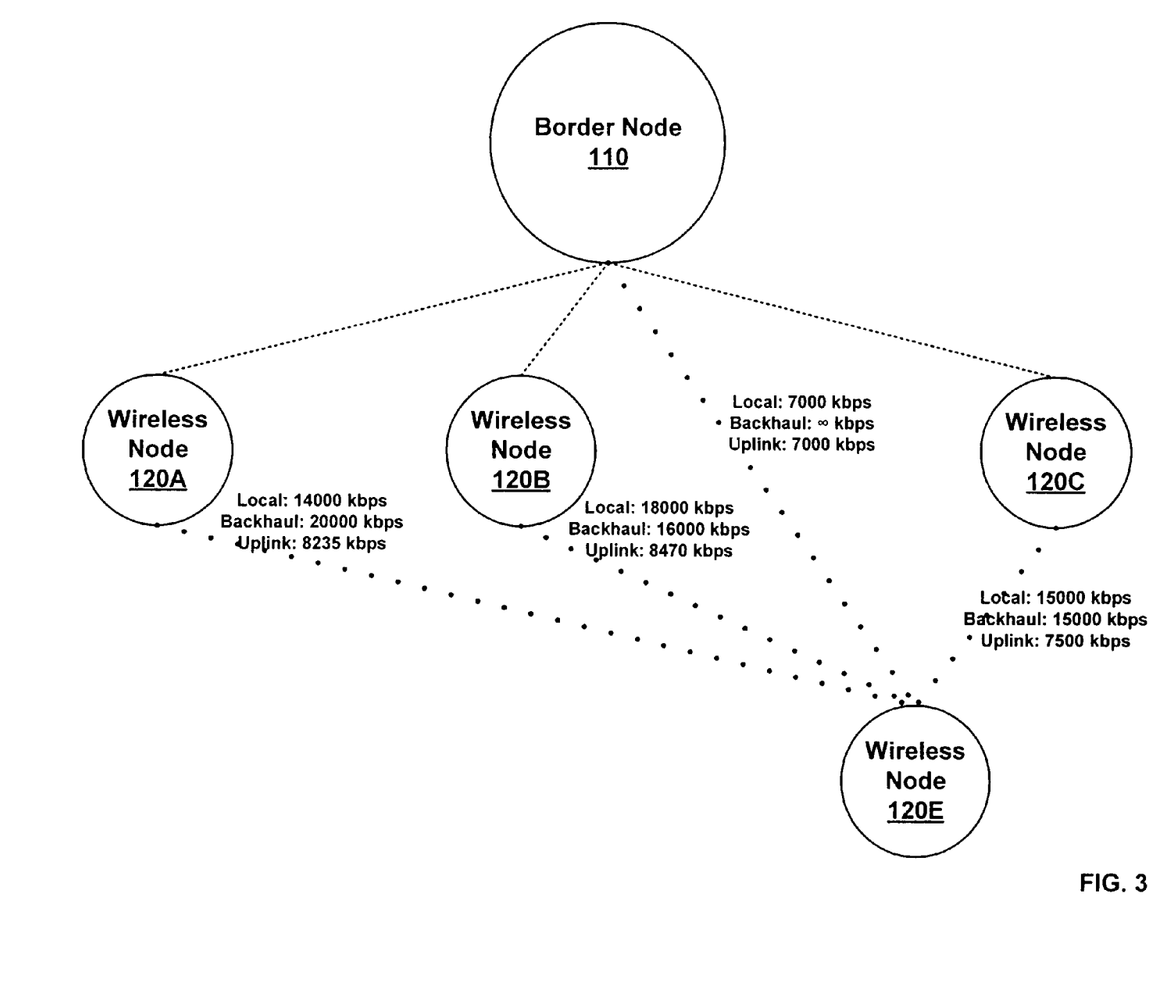
FIG. 3 illustrates an exemplary implementation of a system for determining associations in a mesh network.

FIG. 3 illustrates an exemplary implementation of a system for determining associations in a mesh network 100 according to an exemplary embodiment of the present invention. The system for determining associations in mesh network 100 may be used by new nodes and in response to updated information. For example, wireless node 120D in FIG. 1 may fail and drop out of the mesh network 100. Wireless node 120D was a parent node to wireless node 120E, which may have to find another parent node with which to associate.

Wireless node 120E may send out probe requests and receive probe response from border node 110 and wireless nodes 120A-C. Information in a probe response of a candidate node may include the BSSID, SNR, local throughput, and backhaul throughput. The local and backhaul throughput information may be used to determine an uplink throughput for each candidate node. In the illustration provided, uplink throughput may be calculated using the formula 1/(1/local throughput+1/backhaul throughput). Based on the uplink throughputs determined for each candidate node, wireless node 120B has the highest uplink throughput to wireless node 120E. Wireless node 120E, therefore, may connect to wireless node 120B.

Figure 4:
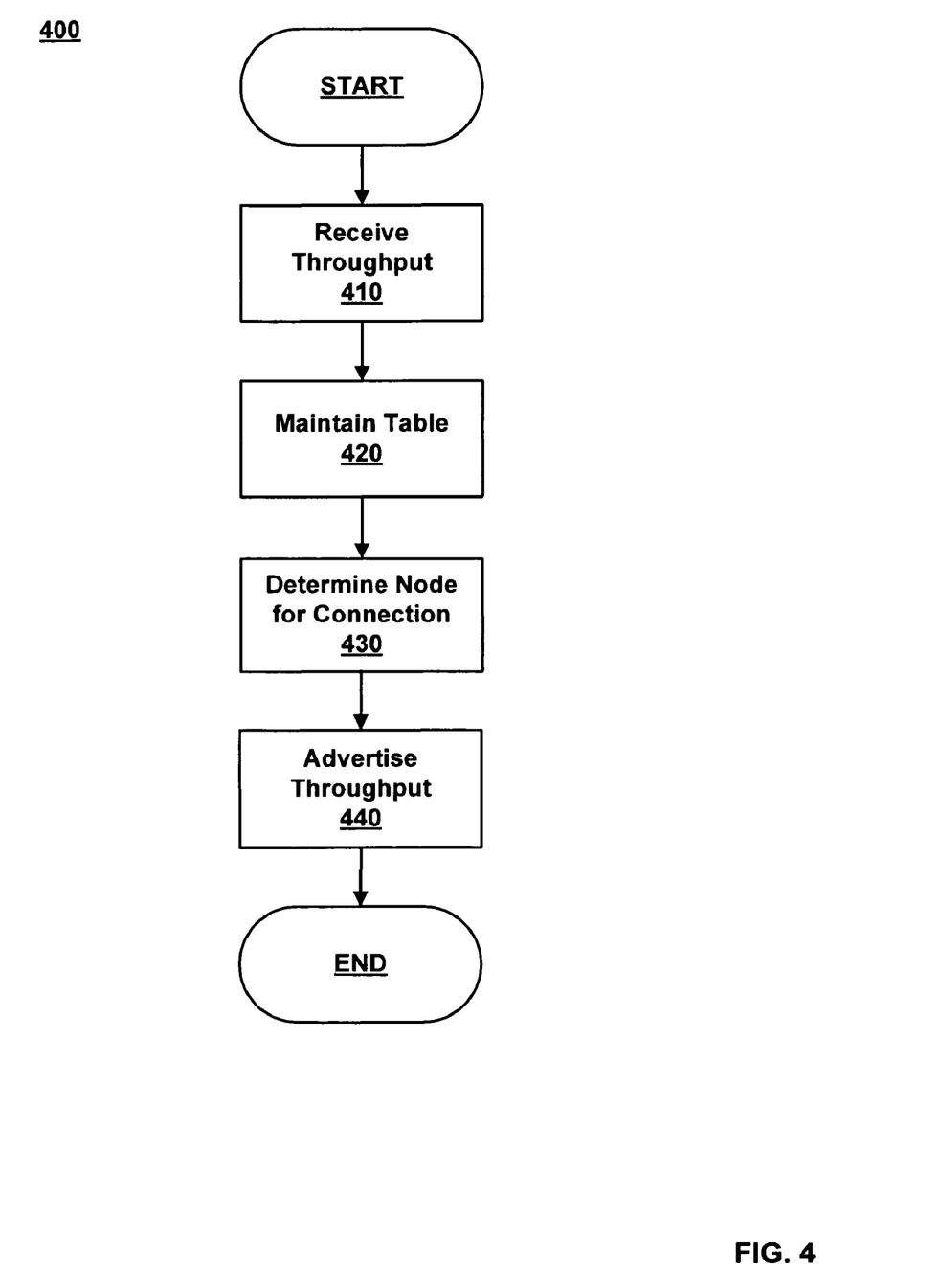
FIG. 4 is a flowchart illustrating an exemplary method for determining associations in a mesh network.

FIG. 4 is a flowchart illustrating a method 400 for determining associations in a mesh network 100 according to an exemplary embodiment of the present invention. The method includes receiving throughput information from candidate nodes, storing the information to a table, determining a candidate node with which to associate, and advertising throughput information to other nodes in the network. A node may need to determine a parent association, for example, if the node is new to mesh network 100, if a current parent node fails, or if a candidate node provides a higher uplink throughput.

In step 410, throughput information from various candidate nodes is received by a receiving node. In some embodiments, the throughput information is received in response to a probe request. For example, wireless node 120E may transmit a probe request and, in response, receive backhaul and local throughput information from border node and nodes 120A-C.

In step 420, a data table concerning the various candidate nodes is maintained by the receiving node. The information received in step 410 may be stored to a table such as data table 220 (FIG. 2). In addition to local and backhaul throughput information, information stored to data table 220 may further include each candidate node's BSSID, SNR, and uplink throughput. The uplink throughput may be calculated using local and backhaul throughput information. In some embodiments, the data table 220 may be ranked by uplink throughput. The data table 220 may also receive updated information concerning the candidate nodes. Updated information concerning local or backhaul throughput, for example, may result in updated uplink throughput.

Other information may be stored in the data table 220 and subsequently used to determine a network node association. For example, information concerning optimal or detrimental antenna configurations, attempted transmissions, successful transmissions, success ratio, received signal strength indicator (RSSI), and various associations between the same may be stored in the table 220 and used in conjunction with or instead of pure throughput calculations to determine an optimized mesh network connection.

In step 430, a candidate node is chosen to serve as a parent node to the receiving node. In some embodiments, the data table 220 is consulted to determine which candidate node will provide the highest uplink throughput. A wireless association is created between the chosen candidate node and the receiving node. In some embodiments, a receiving node may only have one parent node. A parent node, however, may have one or more children, resulting in a tree topology.

In step 440, the backhaul throughput of the receiving node is advertised to other nodes in mesh network 100. The receiving node may serve as a parent to another node in the mesh network 100. In response to probe requests from other nodes in mesh network, the receiving node refers to the uplink throughput calculated for its parent node and advertises that uplink throughput as its backhaul throughput. Because local throughput of the parent node may change over time, the backhaul throughput being advertised may also change.

While the present invention has been described in connection with a series of illustrative embodiments, these descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for determining associations in a mesh network, the method comprising:

storing information in memory of a first node concerning local throughputs in the mesh network, each local throughput approximating a throughput between the first node and a candidate node, wherein the mesh network includes a plurality of candidate nodes;

receiving at the first node information concerning backhaul throughput from one or more candidate nodes in the mesh network, each backhaul throughput approximating a throughput between one of the candidate nodes and a wired border node in the mesh network;

executing instructions stored in memory of the first node, wherein execution of the instructions by a processor of the first node determines an uplink throughput for each of the one or more candidate nodes in the mesh network, each uplink throughput being based on at least the stored local throughput associated with one of the candidate nodes and the backhaul throughput associated with the candidate node;

connecting the first node to a second node, the second node selected from the plurality of candidate nodes in the mesh network based on at least an uplink throughput determined for the second node;

receiving at the first node updated backhaul throughputs associated with each of the plurality of candidate nodes in the network;

executing instructions stored in memory of the first node, wherein execution of the instructions by the processor of the first node determines that an updated uplink throughput of a third node exceeds an updated uplink throughout of the second node by a threshold amount;

disconnecting the first node from the second node; and connecting the first node to the third node based on the updated uplink throughput of the third node exceeding the updated uplink throughput of the second node by a threshold amount.

2. The method of claim 1, further comprising determining the local throughputs between the first node and the plurality of candidate nodes in the network, each local throughput being determined based on results of transmission attempts to one of the candidate nodes.

3. The method of claim 1, wherein storing information in memory comprises maintaining a data table including throughput information associated with the plurality of candidate nodes in the network, and sorting the data table by ranking the uplink throughputs associated with the plurality of candidate nodes in the network.

4. The method of claim 1, wherein the uplink throughput associated with the second node is the greatest uplink throughput among the uplink throughputs associated with the plurality of candidate nodes in the network.

5. The method of claim 1, wherein connecting the first node to the second node is further based on heuristics for determining whether or not to make the connection.

6. The method of claim 1, further comprising broadcasting the uplink throughput associated with the second node as the backhaul throughput of the first node, the broadcast being broadcast from the first node to other nodes in the network.

7. The method of claim 1, wherein determination of an uplink throughput of a candidate node is based on the formula 1/(1/local throughput +1/backhaul throughput), the local throughput and the backhaul throughput both being associated with the candidate node.

8. An apparatus for determining associations in a mesh network, the apparatus comprising:

a data table that stores estimated throughput information concerning a plurality of candidate nodes in the mesh network, the throughput information including:

local throughput information, each local throughput approximating a throughput between a first node and one of the candidate nodes, and backhaul throughput information, each backhaul throughput approximating a throughput between one of the candidate nodes and a wired border node in the mesh network;

a processor that executes instructions stored in memory to:

determine an uplink throughput for each of one or more candidate nodes, each uplink throughput being based on at least the local throughput associated with one of the candidate nodes and the backhaul throughput associated with the candidate node as indicated by the data table, and select a second node from the plurality of candidate nodes for establishing a wireless connection based on at least the uplink throughput determined for the second node; and an antenna that:

wirelessly connects the first node to the identified second node, receives updated backhaul throughputs associated with each of the plurality of candidate nodes in the network, disconnects the first node from the second node, and connects the first node to the third node based on an updated uplink throughput of a third node being determined to exceeding an updated uplink throughput of the second node by a threshold amount.

9. The apparatus of claim 8, wherein the antenna receives the estimated throughput information from the one or more of the plurality of candidate nodes in the network.

10. The apparatus of claim 8, wherein the data table stores updates concerning the estimated throughput information associated with the plurality of candidate nodes in the network.

11. The apparatus of claim 8, wherein the antenna broadcasts the estimated throughput to other nodes in the network.

12. A mesh network system comprising a wired border node configured to act as a gateway between a wired network and a plurality of wireless nodes; and a first wireless node that:

stores information in memory concerning local throughputs, each local throughput approximating a throughput between the first wireless node and a candidate node, wherein the network includes a plurality of candidate nodes, the plurality of candidate nodes including the border node and one or more of the plurality of other wireless nodes, receives backhaul throughputs from one or more candidate nodes, each backhaul throughput approximating a throughput between one of the candidate nodes and the wired border node, determines an uplink throughput for each of the one or more candidate nodes, each uplink throughput based on at least the stored local throughout associated with the candidate node and the backhaul throughput received from the candidate node, wirelessly connects to a selected candidate node based on at least the uplink throughput determined for the selected candidate node, receives updated backhaul throughputs associated with each of the plurality of candidate nodes in the network, disconnects from the second node, and connects to a third node based on an updated uplink throughput of a third node being determined to exceed an updated uplink throughput of the second node by a threshold amount.

13. The mesh network system of claim 12, wherein the first wireless node is further configured to be able to connect to one candidate node at a time.

14. The mesh network system of claim 12, further comprising the plurality of other wireless nodes.

15. The mesh network system of claim 12, wherein a set of wireless nodes from the plurality of wireless nodes automatically connects to the wired border node.

16. A non-transitory computer-readable storage medium having embodied thereon a program, the program being executable by a computer processor to perform a method for determining associations in a wireless network comprising:
- storing information concerning local throughputs, each local throughput approximating a throughput between a first node and a candidate node, wherein the network includes a plurality of candidate nodes;
- receiving information concerning backhaul throughput from one or more candidate nodes in the network, each backhaul throughput approximating a throughput between one of the candidate nodes and a wired border node in the network;
- determining an uplink throughput for each of the one or more candidate nodes in the network, each uplink throughput being based on at least the stored local throughput associated with one of the candidate nodes and the backhaul throughput associated with the candidate node;
- selecting a second node from the plurality of candidate nodes in the network for establishing a wireless connection based on at least an uplink throughput determined for the second node,
- receiving at the first node updated backhaul throughputs associated with each of the plurality of candidate nodes in the network;
- determining that an updated uplink throughput of a third node exceeds an updated uplink throughout of the second node by a threshold amount;
- deselecting the second node;
- and selecting the third node for establishing a wireless connection based on the updated uplink throughput of the third node exceeding the updated uplink throughput of the second node by a threshold amount.

* * * * *